United States Patent
Cheng et al.

(10) Patent No.: US 10,728,909 B2
(45) Date of Patent: Jul. 28, 2020

(54) METHODS, DEVICES, AND SYSTEMS FOR NETWORK ASSISTED TRANSMISSION WITH MULTIPLE COMPONENT CARRIERS

(71) Applicant: FG Innovation Company Limited, Tuen Mun (CN)

(72) Inventors: Yu-Hsin Cheng, Hsinchu (TW); Hung-Chen Chen, Hsinchu (TW); Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/190,502

(22) Filed: Nov. 14, 2018

(65) Prior Publication Data

US 2019/0150161 A1    May 16, 2019

Related U.S. Application Data

(60) Provisional application No. 62/585,607, filed on Nov. 14, 2017.

(51) Int. Cl.
*H04W 72/08* (2009.01)
*H04J 11/00* (2006.01)
*H04L 5/00* (2006.01)
*H04L 1/00* (2006.01)

(52) U.S. Cl.
CPC ....... *H04W 72/085* (2013.01); *H04J 11/0073* (2013.01); *H04J 11/0076* (2013.01); *H04L 1/00* (2013.01); *H04L 5/001* (2013.01); *H04L 5/0023* (2013.01); *H04L 5/0032* (2013.01); *H04L 5/0048* (2013.01); *H04L 5/0053* (2013.01); *H04L 5/0091* (2013.01); *H04L 5/0055* (2013.01)

(58) Field of Classification Search
None
See application file for complete search history.

(56) References Cited

U.S. PATENT DOCUMENTS

| | | | |
|---|---|---|---|
| 2017/0237535 A1 | 8/2017 | Park et al. | |
| 2018/0205585 A1* | 7/2018 | Sadiq | H04B 7/088 |
| 2018/0270686 A1* | 9/2018 | Bergstrom | H04W 24/10 |
| 2018/0324022 A1* | 11/2018 | Sheng | H04L 1/1614 |

FOREIGN PATENT DOCUMENTS

| | | |
|---|---|---|
| CN | 105580297 A | 5/2016 |
| WO | 2017022870 A | 2/2017 |

* cited by examiner

*Primary Examiner* — Jamaal Henson
(74) *Attorney, Agent, or Firm* — ScienBiziP, P.C.

(57) ABSTRACT

A method for a user equipment (UE) is described. The method comprises receiving, through reception circuitry of the UE, a Synchronization Signal (SS) block bitmap from a primary cell (PCell), the SS block bitmap having one or more SS block bits corresponding to one or more SS block indices; monitoring or measuring, through the reception circuitry, one or more SS blocks from a secondary cell (SCell) based on the SS block bitmap.

18 Claims, 17 Drawing Sheets

FIG. 7C

RRC QCL Assumption

| CSI-RS resource #0 | CSI-RS resource #1 | CSI-RS resource #2 | CSI-RS resource #4 | CSI-RS resource #6 | SS block #1 | TRS port #1 | TRS port #3 |
|---|---|---|---|---|---|---|---|

MAC-CE

| 0 | 0 | 0 | 0 | 0 | 0 | 0 | 0 |
|---|---|---|---|---|---|---|---|
| 0 | 0 | 0 | 1 | 0 | 0 | 0 | 1 |
| 0 | 0 | 0 | 0 | 1 | 0 | 1 | 1 |

00000101 indicates the 6$^{th}$ RS

→ CSI-RS resource #0, #1 and TRS port #1

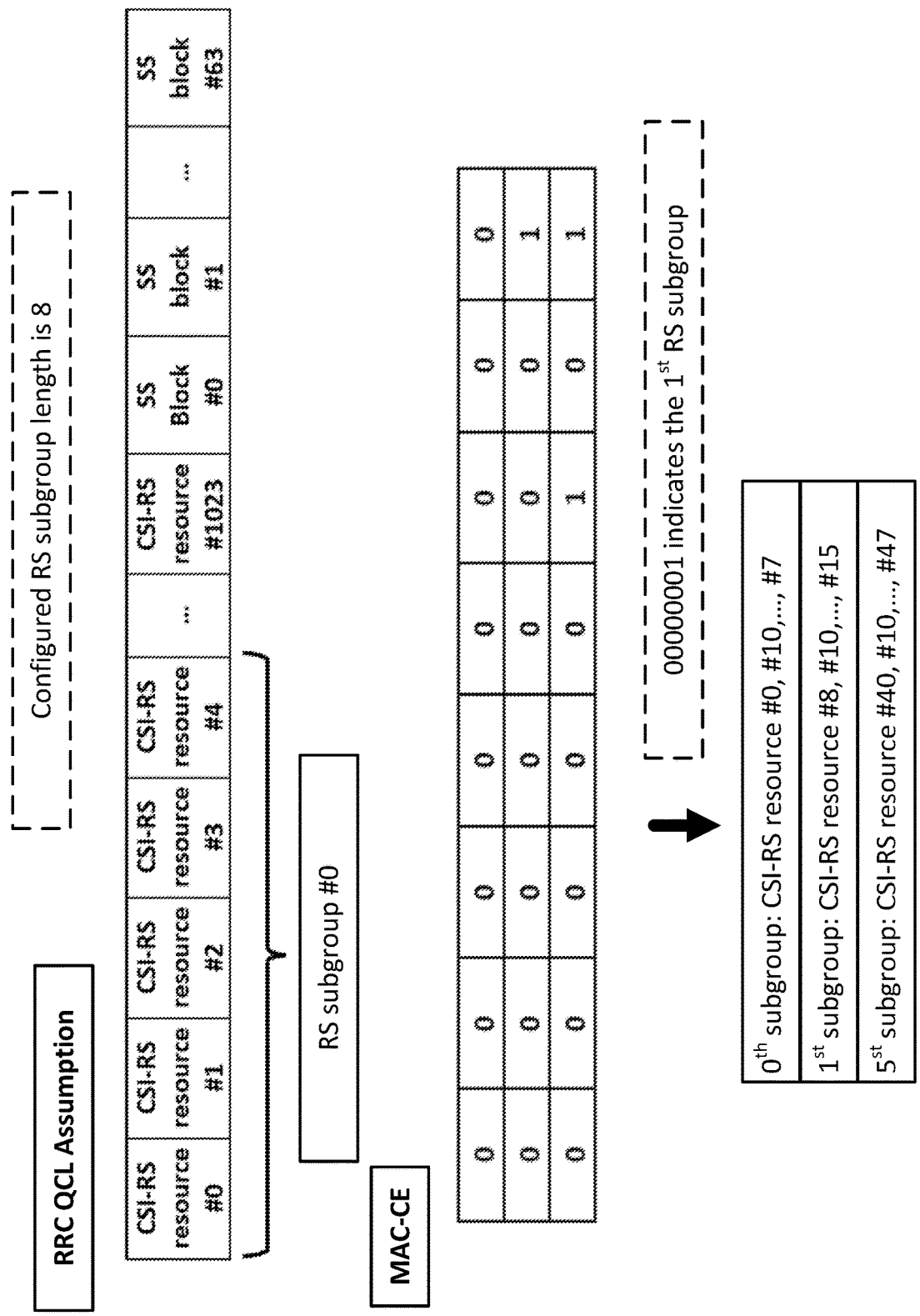

FIG. 11

| CSI-RS resource #0 | CSI-RS resource #1 | CSI-RS resource #2 | CSI-RS resource #3 | CSI-RS resource #4 | SS block #0 | SS block #1 | TRS port #0 | TRS port #1 |

RRC QCL Assumption

FIG. 12

DCI:
- CIF : 010
- TCI : 001

FIG. 13

```
SCG-Configuration:
- scg-ConfigPartSCG
 - pSCellToAddMod
  - sCellIndex
  - cellIdentification
  - radioResourceConfigCommonSCell
   - SS block actual transmitted bitmap
    - 1111111100000000
     00000000000000000
     00000000000000000
     00000000000000000
  - radioResourceConfigDedicatedSCell
```

1442: Receive, through reception circuitry, a measurement report having beam-related measurements of an Scell from a UE 1444: Provide, through transmission circuitry, an SS block bitmap to the UE from a Pcell, the SS block bitmap having one or more SS block bits corresponding to one or more SS block indices, where the SS block bitmap is transmitted to the UE through RRC signaling, and where the one or more SS block bits being "1" indicates that the corresponding one or more SS block are to be measured by for the UE, and where the one or more SS block bits being "0" indicates that the corresponding one or more SS block are not to be measured by the UE

METHODS, DEVICES, AND SYSTEMS FOR NETWORK ASSISTED TRANSMISSION WITH MULTIPLE COMPONENT CARRIERS

CROSS-REFERENCE TO RELATED APPLICATION(S)

The present application claims the benefit of and priority to a provisional U.S. Patent Application Ser. No. 62/585,607 filed on Nov. 14, 2017, entitled "Method and Apparatus for a Network Assisted Transmission with Multiple Component Carriers," (hereinafter referred to as "US72233 application"). The disclosure of the US72233 application is hereby incorporated fully by reference into the present application.

FIELD

The present disclosure generally relates to wireless communication, and more particularly, to network assisted transmission with multiple component carriers.

BACKGROUND

In the $4^{th}$ generation (4G) Long-Term-Evolution (LTE) wireless communication systems, to utilize multi-carrier transmission, user equipments (UEs) need to establish a connection to a primary cell (PCell) first, perform measurements in response to the received measurement configurations from the PCell, and send corresponding measurement reports to the current serving base station to determine one or more component carriers (CCs) (e.g., secondary cells (SCells)) to connect to. In the next generation (e.g., the $5^{th}$ generation (5G) New Radio (NR)) wireless communication networks, multi-carrier transmissions, such as carrier aggregation (CA) and dual connectivity (DC), will operate in higher frequency bands. As such, multi-carrier transmission in the next generation wireless communication networks may need to compensate for the high pathloss in high frequency bands.

Beam operations in high frequency bands, such as high modulation (e.g., 64QAM), need to be supported by high quality signals. Thus, the next generation wireless communication networks need to utilize beamforming gain obtained from directional phase array antennas to enhance data rates. Beamforming gain may be obtained on both transmission (TX) and reception (RX) antennas. While beamforming gain can alleviate performance degradation caused by pathloss, beamforming may result in reduced beam width. Thus, the network and UEs have to perform extra procedures to align beams toward target directions for both TX and RX beamforming to maintain high data rate.

The conventional beam alignment procedure can cause excessive power consumption and severe latency since a UE needs to perform RX beam sweeping to each TX beam from a base station until the UE finds a pair of RX and TX beams, which satisfies a received power requirement. In a case of carrier aggregation of a cell group, a secondary cell (SCell)'s activation and deactivation may happen frequently. It would be unacceptable and/or undesirable if a time-consuming beam alignment procedure needs to be performed for each SCell activation. In addition, for primary SCell (PSCell) addition in dual connectivity, since the dedicate RACH configurations may be provided based on the beam information from the master node, a fast beam alignment procedure for PSCell addition may also be desirable.

Thus, there is a need in the art for an improved beam alignment procedure for both SCell activation and PSCell addition for transmission in multiple component carriers in the next generation (e.g., 5G NR) wireless communication systems.

SUMMARY

The present disclosure is directed to methods, devices, and systems for network assisted transmission with multiple component carriers.

In a first aspect of the present disclosure, a method for a user equipment (UE) is described, the method comprising: receiving, through reception circuitry of the UE, a Synchronization Signal (SS) block bitmap from a primary cell (PCell), the SS block bitmap having one or more SS block bits corresponding to one or more SS block indices; measuring, through the reception circuitry, one or more SS blocks from a secondary cell (SCell) based on the SS block bitmap.

In an implementation of the first aspect, the method further comprises providing, by transmission circuitry of the UE, a measurement report to the PCell, the measurement report having beam-related measurements of the SCell.

In another implementation of the first aspect, the PCell and SCell are of a same cell group.

In yet another implementation of the first aspect, the PCell and SCell are of different cell groups.

In yet another implementation of the first aspect, the one or more SS block indices correspond to one or more SS block positions in burst from the SCell.

In yet another implementation of the first aspect, the one or more SS block bits being "1" indicates that the corresponding one or more SS block are to be measured by the UE; the one or more SS block bits being "0" indicates that the corresponding one or more SS block are not to be measured by the UE.

In a second aspect of the present disclosure, a user equipment (UE) is described, the UE comprising: one or more non-transitory computer-readable media having computer-executable instructions embodied thereon; at least one processor coupled to the one or more non-transitory computer-readable media, and configured to execute the computer-executable instructions to: receive, through reception circuitry of the UE, a Synchronization Signal (SS) block bitmap from a primary cell (PCell), the SS block bitmap having one or more SS block bits corresponding to one or more SS block indices; measure, through the reception circuitry, one or more SS blocks from a secondary cell (SCell) based on the SS block bitmap.

In an implementation of the second aspect, the at least one processor is further configured to execute the computer-executable instructions to: transmit, by transmission circuitry of the UE, a measurement report to the PCell, the measurement report having beam-related measurements of the SCell.

In another implementation of the second aspect, the PCell and SCell are of a same cell group.

In yet another implementation of the second aspect, the PCell and SCell are of different cell groups.

In yet another implementation of the second aspect, the one or more SS block indices correspond to one or more SS block positions in burst from the SCell.

In yet another implementation of the second aspect, the one or more SS block bits being "1" indicates that the corresponding one or more SS block are to be measured by the UE; the one or more SS block bits being "0" indicates that the corresponding one or more SS block are not to be measured by the UE.

In a third aspect of the present disclosure, a method for a base station is described, the method comprising: receiving, through reception circuitry of the base station, a measurement report having beam-related measurements of a secondary cell (SCell) of the base station from a user equipment (UE); providing, through transmission circuitry of the base station, a Synchronization Signal (SS) block bitmap to the UE from a primary cell (PCell) of the base station; wherein the SS block bitmap includes one or more SS block bits corresponding to one or more SS block indices.

In an implementation of the third aspect, the SS block bitmap is transmitted to the UE through Radio Resource Control (RRC) signaling from the PCell of the base station.

In another implementation of the third aspect, the PCell and SCell are of a same cell group.

In yet another implementation of the third aspect, the PCell and SCell are of different cell groups.

In yet another implementation of the third aspect, the one or more SS block indices correspond to one or more SS block positions in burst from the SCell.

In yet another implementation of the third aspect, the one or more SS block bits being "1" indicates that the corresponding one or more SS block are to be measured by the UE; the one or more SS block bits being "0" indicates that the corresponding one or more SS block are not to be measured by the UE.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

FIGS. 7A, 7B, 7C, and 7D are diagrams of RRC signaling and Media Access Control-Control Element (MAC-CE) content for a two-stage indication, according to example implementations of the present application.

FIG. 11 is a diagram showing beam information of a Quasi Co-Location (QCL) configuration, according to an example implementation of the present application.

FIG. 12 is a diagram showing an SCell activation and Transmission Configuration Indication (TCI) for beam information in a DCI, according to an example implementation of the present application.

FIG. 13 is a diagram showing a Secondary Cell Group (SCG) configuration with beam information in an RRC connection reconfiguration message, according to an example implementation of the present application.

FIG. 14B is a flowchart of a method for a base station, according to an example implementation of the present application.

DETAILED DESCRIPTION

Figure 1:
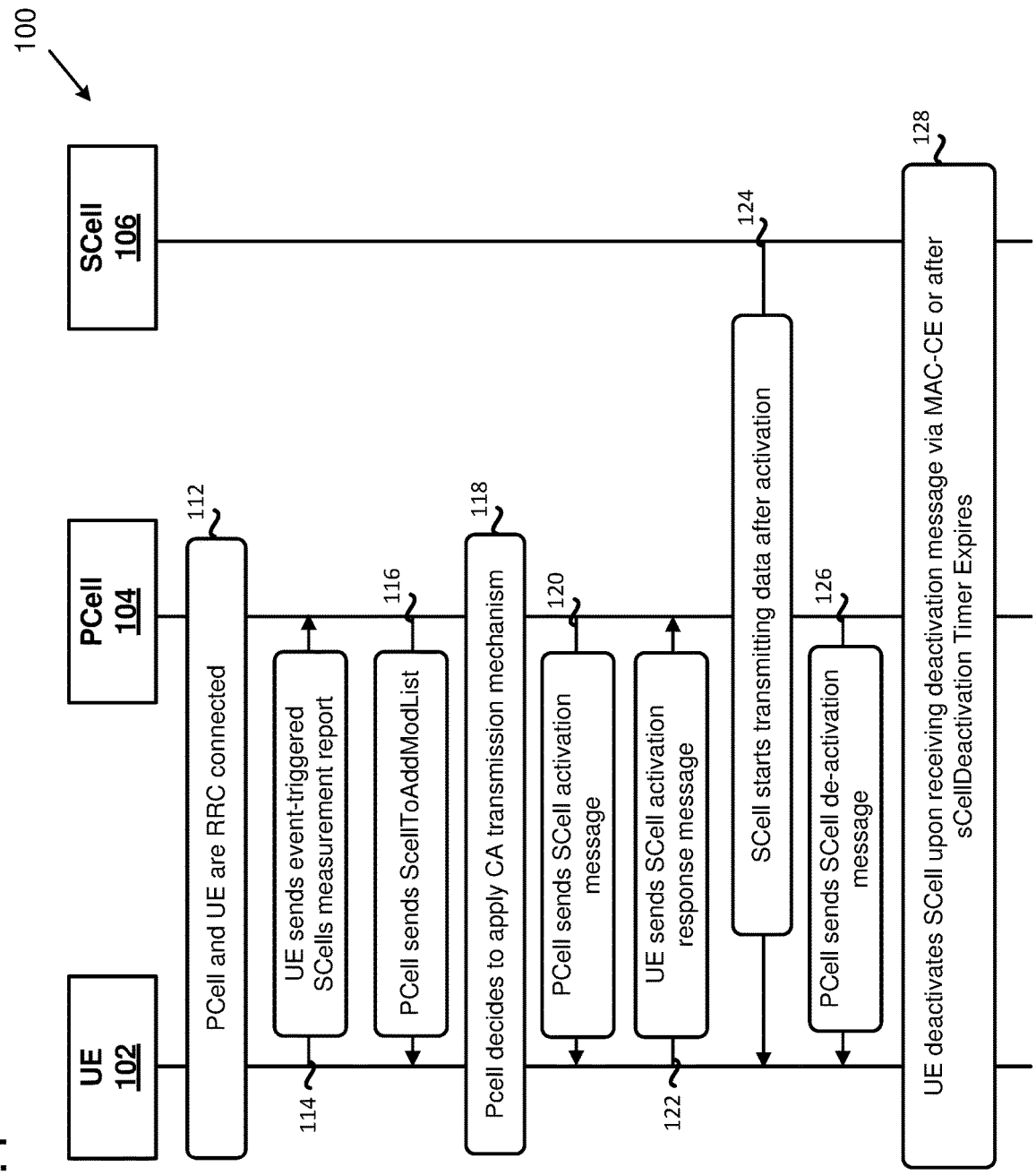
FIG. 1 is a diagram showing enabling and disabling carrier aggregation in a 4G LTE wireless system.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, a LTE-Advanced (LTE-A) system, or a LTE-Advanced Pro system) typically includes at least one base station, at least one UE, and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, an NG-eNB as in an E-UTRA base station in connection with the 5GC, a next generation node B (gNB) as in the 5G-AN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). A cell may be a NR-U cell (i.e., the cell associated with unlicensed band). Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in a NR frame to support ProSe services.

Figure 2:
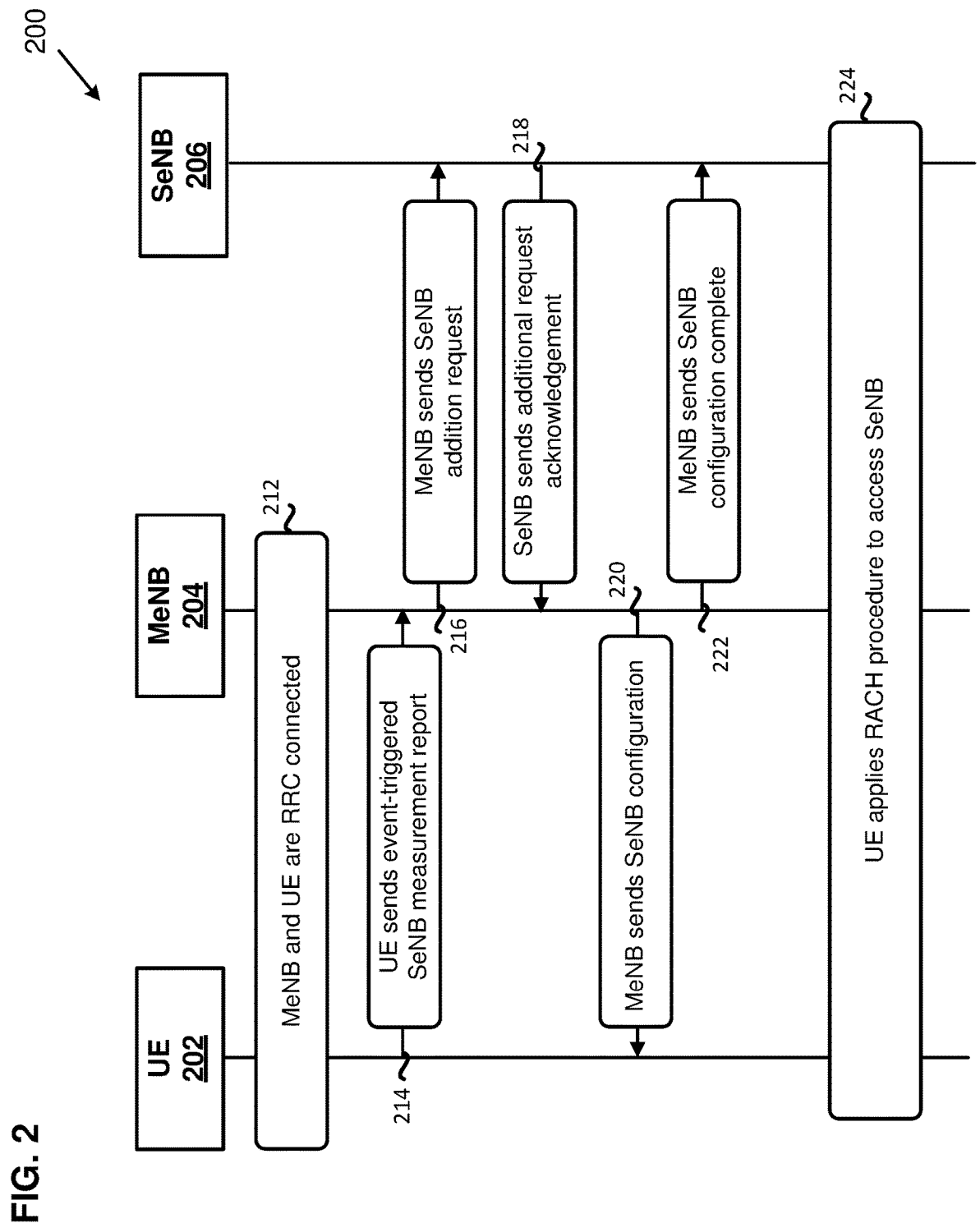
FIG. 2 is a diagram showing enabling and disabling dual connectivity in a 4G LTE wireless system.

FIG. 1 is a diagram showing enabling and disabling carrier aggregation in a 4G LTE system. As shown in FIG. 1, diagram 100 includes actions 112, 114, 116, 118, 120, 122, 124, 126, and 128. In action 112, UE 102 establishes a radio resource control (RRC) connection with a base station via PCell 104. In action 114, UE 102 performs inter-frequency measurements to find one or more qualified cells based on the measurement configurations, and sends a measurement report to the base station through PCell 104. In action 116, the base station, through PCell 104, sends UE 102 a message including an SCellToAddModList information element to UE 102 to configure those cells as SCells for UE 102. The SCellToAddModList information element includes, for example, SCellIndex, CellIdentification, RadioResourceConfigCommonSCell, and RadioResourceConfigDedicatedSCell as shown in FIG. 2. In action 118, the base station decides to start a carrier aggregation transmission. In action 120, the base station, through PCell 104 sends an SCell activation Media Access Control—Control Element (MAC-CE) to UE 102 for activating a configured SCell via the MAC-CE. In the 4G LTE system, if UE 102 receives the SCell activation MAC-CE in subframe # n to activate SCell 106, UE 102 may start monitoring a PDCCH on SCell 106 and PDSCH for SCell 106 no earlier than subframe # n+8 and no later than subframe # n+24 or # n+34, respectively.

In action 122, UE 102 sends an SCell activation response message to PCell 104. In action 124, SCell 106 starts transmitting data after activation. In action 126, PCell 104 sends an SCell deactivation message to UE 102 via a MAC-CE. In action 128, UE 102 deactivates SCell 106 upon receiving the SCell de-activation message or after an SCell deactivation timer expires.

If the actions in diagram 100 were to be implemented in a next generation (e.g., 5G NR) wireless communication system, UE 102 would have to perform beam alignment for an SCell to find qualified beams after SCell 106 is activated. The beam alignment process would cause severe power consumption and increased latency, since UE 102 would need to perform RX beam sweeping to each TX beam from SCell 106 until UE 102 finds a pair of RX and TX beams which satisfies the received power requirement. To perform beam alignment for activating a configured SCell, UE 102 would also need to monitor all the SS blocks of SCell 106 and find the qualified beams for carrier aggregation transmission after UE 102 receives the SCell activation MAC-CE. This beam sweeping procedure would increase latency and power consumption that are essential to system performance. Even though the beam information of SCell 106 is received before the SCell's activation, the beam alignment procedure is needed and increase latency, for example, due to UE mobility.

FIG. 2 is a diagram showing enabling and disabling dual connectivity in a 4G LTE system. As shown in FIG. 2, diagram 200 includes actions 212, 214, 216, 218, 220, 222, and 224. In action 212, UE 202 establishes an RRC connection with a MCG (Master Cell Group) (e.g., MeNB 204). In action 214, UE 202 measures and triggers measurement reports when the signal quality of one or more neighboring cells is qualified. In action 216, MeNB 204 sends a Secondary Cell Group (SCG) addition request to the SCG (e.g., having SeNB 206) to configure dual connectivity. In action 218, the SCG (e.g., through SeNB 206) sends an addition request acknowledgement to MeNB 204. In action 220, the MCG (e.g., through MeNB 204) sends PSCellToAddMod and SCellToAddModListSCG information elements for UE 202 to configure those cells as PSCell and SCells of the SCG for UE 202. The SCellToAddModListSCG information element includes, for example, SCellIndex, CellIdentification, RadioResourceConfigCommonSCell and RadioResourceConfigDedicatedSCell. In action 222, the MeNB 204 sends a SeNB reconfiguration complete message to SeNB 206. In action 224, when MeNB 204 decides to start a dual connectivity transmission, UE 202 performs a random access (RACH) procedure to establish a connection to the PSCell according to the signaling (e.g., reconfiguration for SCG addition). In a reconfiguration for SCG addition, UE 202 may perform the RACH procedure by using the RACH resources indicated by Dedicate RACH configurations. If the dedicated RACH configuration is not present, the UE may fallback to use common RACH configurations, for example. For activating the PSCell, UE 202 would need to perform the beam alignment procedure, which would cause additional latency and power consumption, even when the beam information was contained in the PSCellToAddMod information element as the beam information may not be up-to-date.

Figure 3:
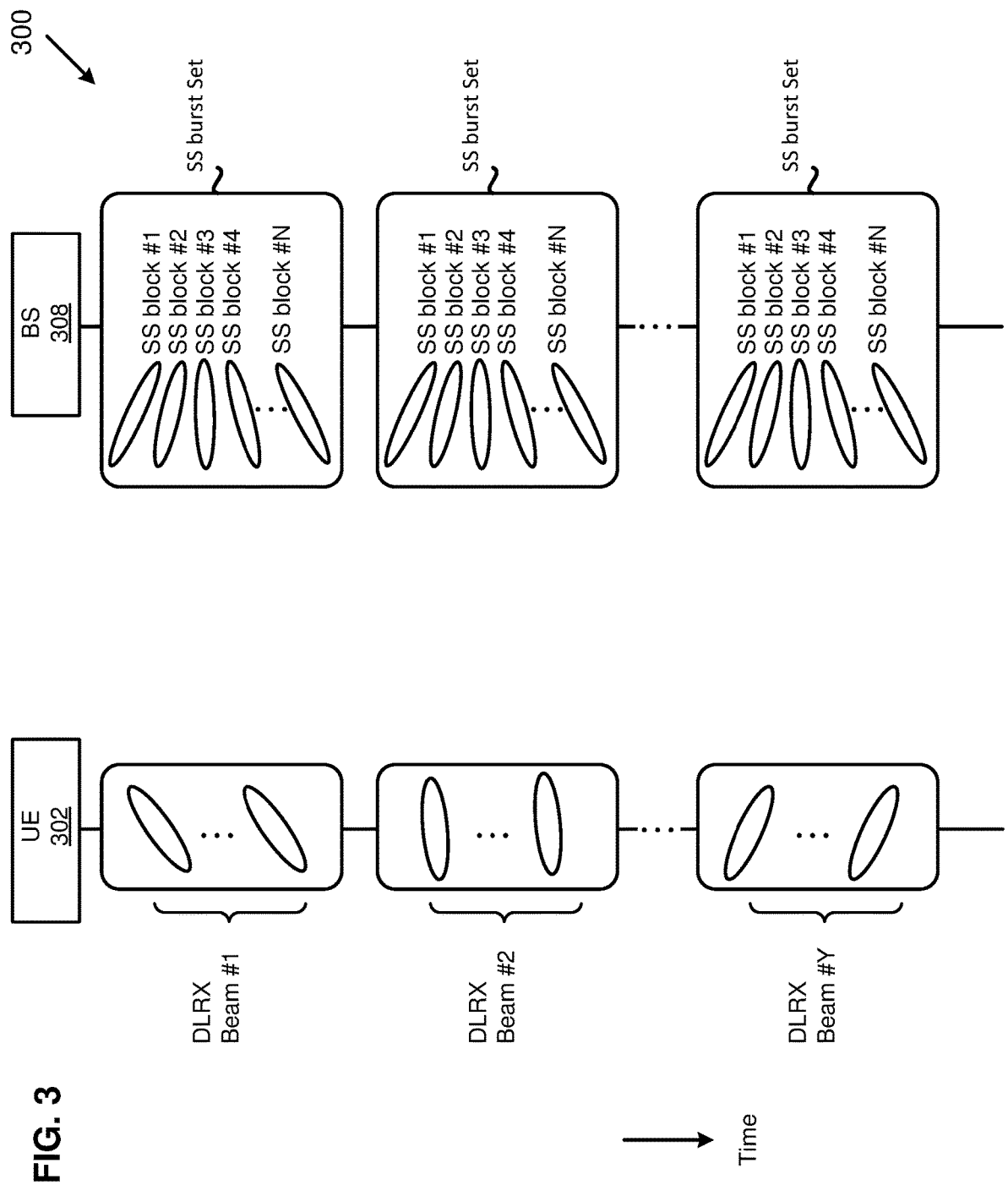
FIG. 3 illustrates a beam alignment procedure without beam information.

FIG. 3 illustrates a beam alignment procedure without beam information. As shown in diagram 300, UE 302 needs to perform RX beam sweeping for TX beam sweeping of all SS blocks (e.g., SS burst sets) from base station 308 to find a qualified beam for DL transmission. Since there may be up to 64 SS blocks of different DL TX beams from base station 308, it can result in high power consumption and access latency.

Figure 4:
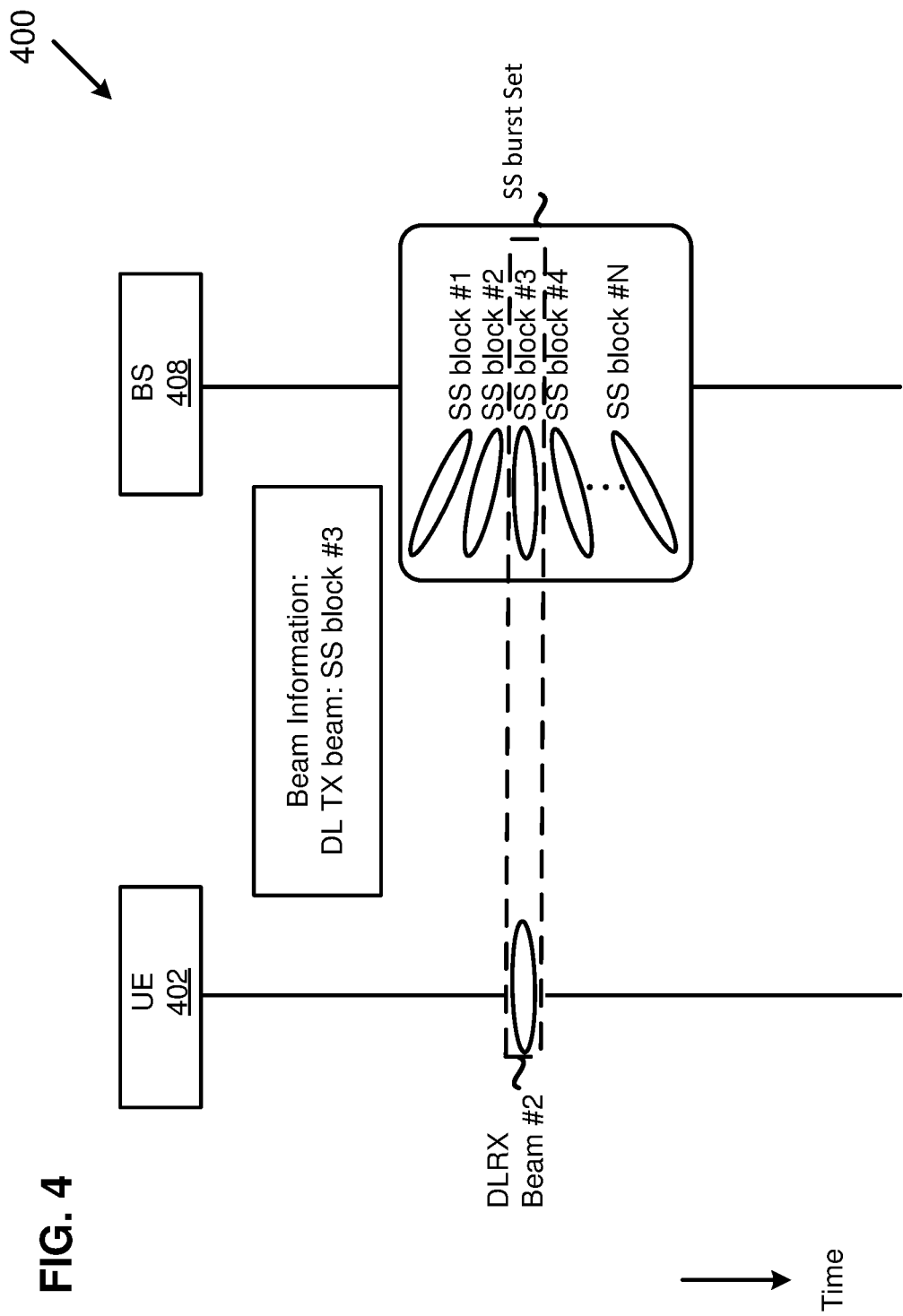
FIG. 4 illustrates a beam alignment procedure, where a base station provides beam information to assist a UE to find qualified beams, according to an example implementation of the present application.

FIG. 4 illustrates a beam alignment procedure, where a base station provides beam information to assist a UE to find qualified beams, according to an example implementation of the present application. As shown in diagram 400, base station 408 provides appropriate DL TX beam information (e.g., an SS block index) to UE 402 prior to beam alignment. Thus, UE 402 knows the exact time to monitor the SS block indicated by base station 408, thus implicitly knows which DL RX beam to use based on, for example, Beam Pair Link (BPL) information.

Furthermore, due to Bandwidth Part (BWP) operations in 5G NR systems, the initial active DL BWP of an SCell may not contain SS blocks for the UE to perform beam alignment, and the periodicity of period channel state information-reference signal (CSI-RS) or tracking reference signal (TRS) contained in the initial active DL BWP of SCell may be too long to satisfy the latency requirement.

According to implementations of the present application, a downlink (DL) beam alignment procedure is used for a UE to find at least one qualified DL TX beam and DL RX beam by monitoring multiple reference signals (RSs) (e.g., Synchronization Signal blocks (SS blocks) or CSI-RS) transmitted by the base station.

Implementations of the present application utilize an inter-cell beam level measurement report and inform a UE beam related information before triggering carrier aggregation or dual connectivity, thereby saving beam alignment procedure overhead for the carrier aggregation or dual connectivity transmission.

In various implementations of the present application, a measurement report configuration may include specific reference signals such as SS block(s) or CSI-RS resource index(ices) for a UE to measure and report the beam level quality.

Figure 5:
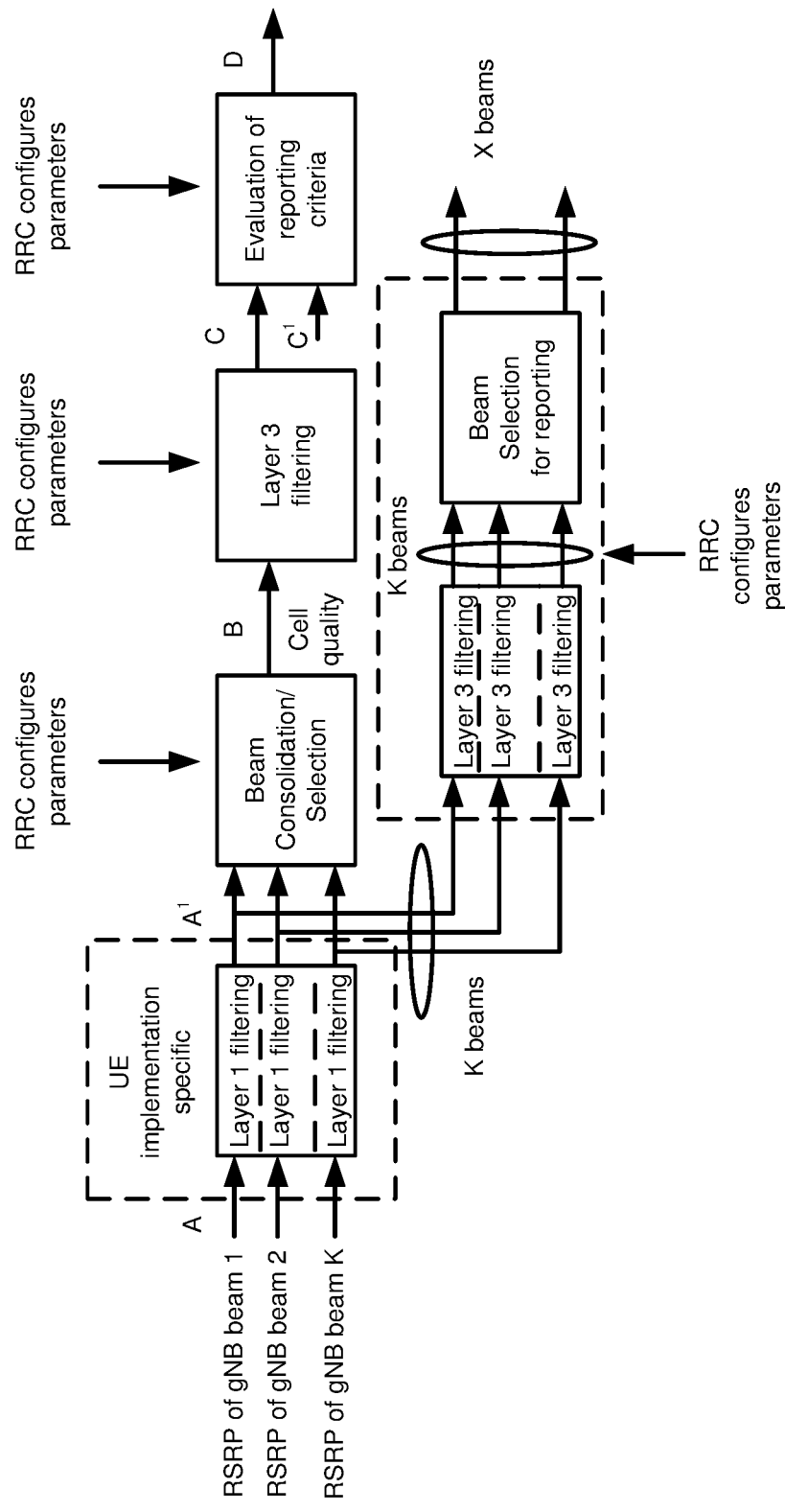
FIG. 5 is a diagram showing a mechanism of cell level and beam level measurement reports.
Figure 6A:
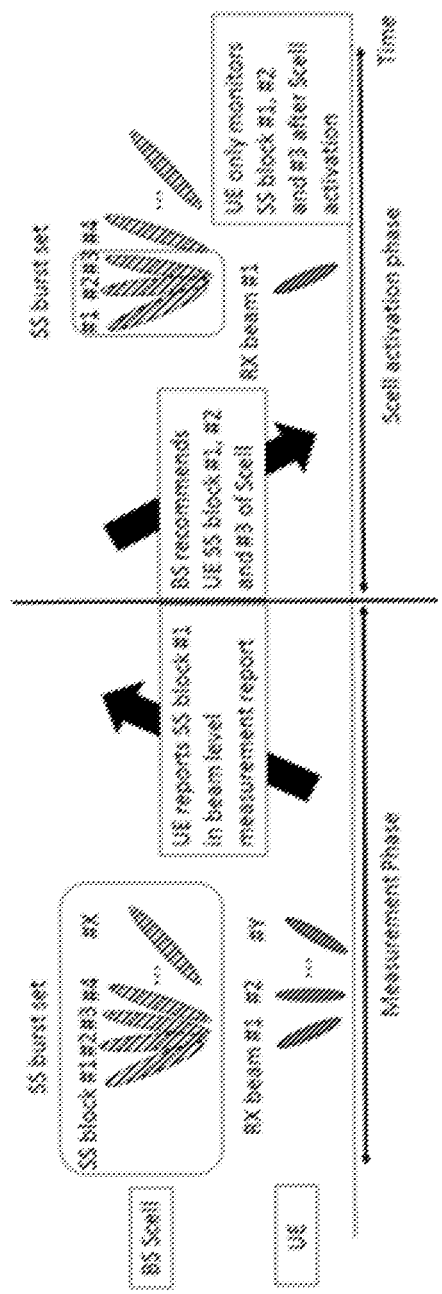
FIG. 6A is a diagram showing a base station recommending neighboring beams, according to an example implementation of the present application.
Figure 6B:
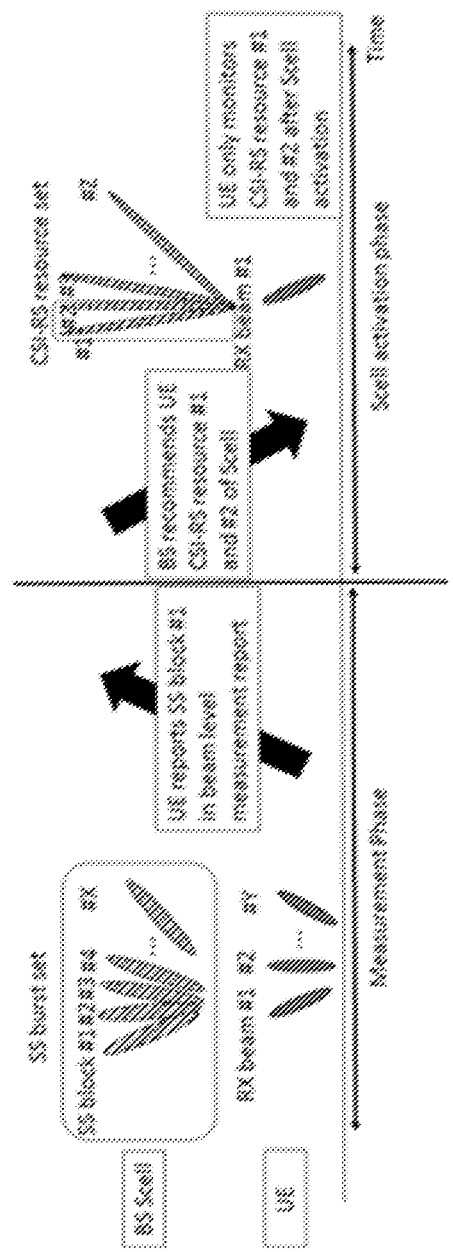
FIG. 6B is a diagram showing a base station recommending reference signals other than the reference signal contained in the measurement report, according to an example implementation of the present application.
Figure 7A:
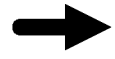
Figure 7B:

FIG. 5 is a diagram showing a mechanism of cell level and beam level measurement reports. A beam level report may be contained in the measurement report if one or more measured beam formed RS quality fulfilled the reporting triggered condition. The UE may report the beams by the order of quality. For example, according to the measurement configuration, if the quality of Cell A fulfills the corresponding triggering condition and the measurement report is then triggered to be sent to the base station. The event-triggered measurement report may contain the cell quality of Cell A together with the corresponding beam information. For example, the quality of SS block 2 of Cell A, which is above the configured threshold (e.g., RSRP threshold or RSRQ threshold) after layer 3 filtering. The cell quality and the beam information may also be derived based on the CSI- RS(s). Therefore, upon receiving the measurement report, the base station may know which DL TX beams is qualified for UE, e.g., SS block 2. Afterwards, the base station may utilize this DL TX beam information to recommend a set of RSs associated to DL TX beam in the first active DL BWP of SCell. It is noted that the default DL BWP of SCell may be the first active BWP of SCell or not (rely on gNB's configuration). It is noted that the base station may deduce additional recommend DL TX beam based on the beam level measurement report. For example, if the beam level measurement report contains only SS block 1 which represents DL TX beam 2, the base station may recommend the UE to monitor RSs associated with neighbor DL TX beam of DL TX beam 1 as shown in FIG. 6A. In another case, the base station may recommend the sets of RSs associated with coarser or finer beam to the UE compared to DL TX beam 1 as shown in FIG. 7B. If the RS contained in beam level measurement report does not contain the first active DL BWP of the SCell, the base station may recommend UE RSs other than the RS contained in the measurement report. For example, if the first active DL BWP of SCell does not contain SS block, the base station may recommend the UE one or more CSI-RS resource sets which are applied in similar beam direction with the RS contained in the measurement report as shown in FIG. 6B.

For carrier aggregation in CASE 1, under CASE 1-1, when a UE sends a beam level measurement report of one or more SCells to a base station, the base station may inform the UE additional SCell beam information in a SCell configuration through an RRC connection reconfiguration message of a PCell. The beam information may be an SS block index, an SS block actual transmitted bitmap (e.g., an SSB-ToMeasure bit map), a CSI-RS resource index, an antenna port information, or a QCL configuration to inform the qualified beam(s) of the SCell based on the previous measurement report. It is noted that it may be only one bit to indicate that the SCell use the same QCL assumption of the PCell for the case where a QCL configuration is in the SCell. Afterward, the base station may send an SCell activation message through a MAC-CE of the PCell. If the UE successfully receives the MAC-CE for activing the SCell, the UE sends an acknowledgement message to the base station through the PCell, and monitors the scheduling information in the SCell.

Thus, the UE may utilize the beam information contained in the RRC connection reconfiguration message to prevent additional beam alignment after receiving the SCell activation message in the MAC-CE.

After the UE replies the SCell activation MAC CE, the UE may attempt to receive data channel or control channel in the SCell.

For the case of SCell activation without beam information, the UE needs to perform beam alignment by monitoring all the beam management RSs (e.g., SS blocks or CSI-RS) in the SCell to find the qualified beam(s) for reception.

For the case of SCell activation with beam information (e.g., when the UE has sent beam level measurement report to the base station before SCell activation), the UE may obtain the beam information based on the SCell configuration. Thus, the UE may utilize the beam information from higher layers (e.g., MAC-CE or RRC) to save resource during L1 beam alignment by only monitoring configured beam management RSs. Furthermore, if the UE fails to receive scheduling information in the SCell based on the configured beam information, the UE may send a new measurement report of the SCell based on the measured result during the monitoring of scheduling information in the SCell. The new measurement report may contain only a cell level measurement report or contain both cell level and beam level measurement reports. If there is no beam level measurement report from the UE, the base station will not include beam information in the SCell configuration. The UE will monitor all the possible location of SS block transmission in SCell for monitoring scheduling information.

In CASE 1-2-1, the beam information may include a two-stage indication by using RRC signaling and MAC-CE. In addition to a MAC-CE containing an SCell activation, CASE 1-2-1 also includes a new MAC-CE containing beam related information.

The beam information may include an SS block index, an SS block actual transmitted bitmap, a CSI-RS resource index, antenna port information or a QCL indication to inform the qualified beam of the SCell based on the previous measurement report. For the case of QCL indication, the UE may assume that the SCell uses the same QCL configuration as the PCell. The first stage may include detailed beam information (e.g., SS block actual transmitted bitmap or QCL configuration) contained in an RRC connection reconfiguration message, and the second stage is a specific beam indication (e.g., SS block indices or QCL indication) contained in a MAC-CE. The MAC-CE may indicate specific RS indices with binary operation other than a detailed RS bitmap in RRC signaling for the UE to monitor/measure as shown in FIGS. 7A, 7B, 7C, and 7B. FIG. 7A is a case where a base station only indicates one beam. FIG. 7B is a case where a base station indicates three neighbor beams for the UE. FIG. 7C is a case for a beam indication by a QCL configuration containing measured RSs. In this case, the UE follows the order of the RSs contained in the QCL configuration to find the corresponding RSs based on the MAC-CE. FIG. 7D is a case for a beam set indication by a QCL configuration containing a number of measured RSs. In this case, the UE follows the order of the RSs contained in the QCL configuration to find the corresponding RSs based on a MAC-CE by the RSsubgroup length configured through the RRC message or the MAC-CE. The subgroup beam indication may be also used for an actual SS block transmitted bitmap, where the UE will monitor/measure those beams, that are indicated by both the MAC-CE and the actual SS block transmitted bitmap. It is noted that the sub-header of the MAC-CE may contain the length of MAC-CE for UE to know the information regarding how many indicated beams are contained in the SCell activation MAC-CE. If the UE does not receive scheduling information in the SCell based on configured beam information, the UE may send a new measurement report of the SCell based on the measured result during the monitoring of scheduling information in the SCell. It is noted that the new measurement report may be based on the SS block actual transmitted bitmap contained in the RRC connection reconfiguration. The new measurement report may contain only a cell level measurement report or contain both the cell level and beam level measurement reports. If there is only a cell level measurement report, the base station may not contain beam information in the SCell configuration. The UE may need to monitor/measure all the possible location of SS block transmission in the SCell for receiving data channel or control channel.

If the SCell activation MAC-CE activates multiple SCells at the same time, the number of indicated beam information may be pre-defined or configured as the same number for each SCell. For example, if there are 64 information bits being used for beam information upon a MAC-CE and 10 SCells are activated by the same SCell activation MAC-CE. Thereafter, when only 8 SCells are configured with beam information upon the SCell configuration MAC-CE, and each SCell may have 8 information bits for reporting beam information in the MAC-CE. In one implementation under multiple SCell activation, when there are some activated SCells with beam information for beam alignment and some activated SCells without beam information for beam alignment, two different MAC-CEs are utilized, one for the activated SCells with beam information and the other for the activated SCells without beam information. The LCID of the MAC-CE for the SCell activation MAC-CE with beam information is different from the corresponding LCID of the MAC-CE for SCell activation MAC-CE without beam information.

In CASE 1-2-2, the same LCID can be used, but different values may be set for the Reserve bit contained in the MAC-CE for the multiple SCell activation case. For example, if the reserve bit is 1, the MAC-CE contains beam information for one or more SCells. On the other hand, if the reserve bit is 0, the MAC-CE does not contain any beam information.

In CASE 1-3, a base station may use a MAC-CE bitmap to indicate which SS block is appropriate for beam alignment without having any beam related information in RRC signaling. For example, "1" may indicate that the SS block is actual transmitted and its signal strength is sufficient strong (e.g., larger than a pre-defined threshold), and "0" may indicate that the SS block is not transmitted or the detected signal strength is not good (e.g., smaller than another pre-defined threshold). It is noted that the bitmap length may be equal to that of the SS block actual transmitted bitmap, and the SS block actual transmitted bitmap may be a detailed bitmap as in RRC signaling or a group-bitmap as transmitted in broadcast signaling. When the UE receives the bitmap, the prioritization of beam alignment toward the specific SS block (which ones are assigned with "1" in the bitmap) is up to UE implementation. It is noted that the UE may distinguish the MAC-CE with beam information and the MAC-CE without beam information by MAC-CE or reserved bits as described in CASE 1-2.

In CASE 1-4, an SCell activation MAC-CE is transmitted by a DCI and the beam information is two-stage indicated by DCI and RRC signaling. In CASE 1-4, a UE monitors a DCI format of a PDCCH in a PCell to obtain an SCell ID and beam information of SCell. The beam information may include indices (e.g., Transmission Configuration Indication (TCI)) which may indicate one of the QCL configuration. The number of bits for TCI is then implicitly known by the UE according to the number of beams contained in an RRC QCL configuration. For example, if the number of beams in an RRC QCL configuration is 8, the UE knows that there are 3 TCI bits in the DCI. The QCL configuration is contained in the SCell configuration in the RRC connection reconfiguration. It is noted that if the UE does not find a QCL configuration in the SCell configuration while there is a TCI contained in the DCI for the SCell scheduling, the UE may reuse the QCL assumption of the PCell for beam information of the SCell. If the UE does not receive scheduling information in the SCell based on the configured beam information, the UE may send a new measurement report following the previous description. It is noted that if there is beam information contained in the SCell configuration, the UE may monitor additional DCI format which is used for transmitting the SCell activation with beam information.

For dual connectivity, when a UE has sent a beam level measurement report of cells in a SCG to a MCG, the base station may inform the UE additional beam information of the cells in the SCG through an SCG configuration contained in an RRC connection reconfiguration message through the MCG. The beam information may be an SS block actual transmitted bitmap which may be configured for each cell. For example, each cell in the SCG may use the configured SS block actual transmitted bitmap contained in the SCG configuration. It is noted that cells, which may be configured by the SCG configuration, may include both PSCell and SCell(s). Since SCell activation operations in the MCG and SCG follow the same procedure as in the carrier aggregation case, similar procedures in carrier aggregation may apply. It should be noted that a RACH procedure is essential for PSCell activation. Without the assistance of beam information, the UE needs to monitor/measure all the SS blocks before sending MSG1 to find a qualified beam. If there is no bitmap contained in the SCG configuration, the UE needs to monitor/measure all the possible locations of SS block transmission to find the qualified beam for the RACH procedure as shown in FIG. 3. On the other hand, when there is an SS block actual transmitted bitmap contained in the SCG configuration, the UE may save resource and time that would otherwise be used for the beam alignment procedure as shown in FIG. 4.

Figure 8:
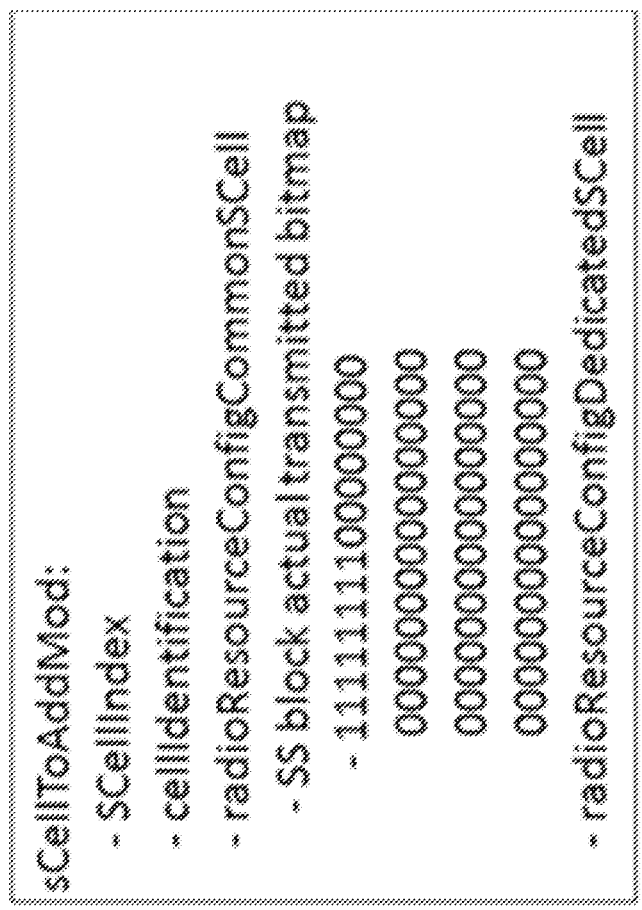
FIG. 8 is a diagram showing an SCell configuration with beam information of SS block actual transmitted table, according to an example implementation of the present application.

In CASE 1 for carrier aggregation described above, the beam information is in RRC connection reconfiguration only. A UE may perform cell measurement and send a beam level measurement report to a base station through a PCell when the measurement result is above a pre-determined threshold. When the base station receives the beam level measurement report of one or more cells (e.g., SCells), the base station may include the beam information of SS block actual transmitted table in the RadioResourceConfigCommonSCell (or ServingCellConfig) of SCell configuration (SCellConfig) 800 as shown in FIG. 8. It is noted that the beam information may be contained in any sub-information element in the SCell configuration such as RadioResourceConfigCommonSCell or RadioResourceConfigDedicatedSCell. The beam information may be an SS block index, an SS block actual transmitted bitmap (e.g., 64 bits), a CSI-RS resource index, antenna port information or a QCL indication. On the other hand, if the base station only receives a cell level measurement report of a SCell, the SCell configuration will not contain beam information. After the UE receives the SCell configuration through RRC signaling of the PCell, the base station may send an SCell activation MAC-CE in the PCell, and monitor/measure the response of the UE to trigger an SCell transmission. The UE may reply an acknowledgement (ACK) if the UE receives the SCell activation message successfully. When the response of the SCell activation MAC-CE is an ACK message, the base station may be able to schedule data transmission upon the SCell for the UE. In the case where the SCell configuration does not contain beam information, the UE may perform beam alignment by monitoring all the beam management RS (e.g., SS blocks or CSI-RS) in the SCell to find the qualified DL TX beam and DL RX beam for reception data channel or control channel. On the other hand, for the case that the SCell configuration contains beam information, the UE may save some resource of beam alignment. For example, if the UE receives a bitmap, the UE may only need to monitor/measure the first eight SS blocks for beam alignment.

When the UE does not receive data or control information in the SCell, the UE may perform measurement in the SCell and send a measurement report to the base station through the PCell. The measurement report may be cell level or beam level.

When the base station receives the measurement report of the SCell, the base station may send the SCell configuration again to renew beam information if the beam level measurement result is good enough for the SCell transmission. If the measurement result is below the threshold of SCell activation which is pre-configured, the base station may send an SCell modification or SCell release through RRC connection reconfiguration.

Figure 9:
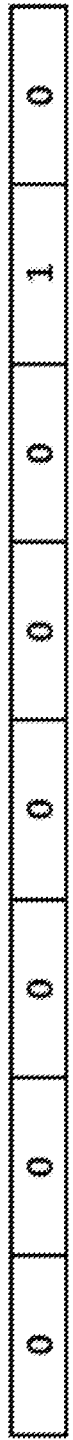
FIG. 9 is a diagram showing specific beam information in a MAC-CE, according to an example implementation of the present application.

In CASE 1-2 described above, the beam information is in an RRC connection reconfiguration and a MAC-CE. A UE may perform cell measurement and send a beam level measurement report to a base station through a PCell if the measurement result is above a pre-determined threshold. When the base station receives the beam level measurement report of one or more cells, the base station may add the beam information of SS block actual transmitted table in the RadioResourceConfigCommonSCell (or ServingCellConfig) of SCell configuration (SCellConfig) 800 as shown in FIG. 8. It is noted that the beam information may be contained in any sub-information element in the SCell configuration such as RadioResourceConfigCommonSCell or RadioResourceConfigDedicatedSCell. The beam information may be an SS block index, an SS block actual transmitted bitmap, a CSI-RS resource index, antenna port information or a QCL table. On the other hand, if the base station only receives a cell level measurement report of the SCell, the SCell configuration does not contain beam information. After the UE receives the SCell configuration through RRC signaling of the PCell, the base station may send an SCell activation MAC-CE and specific beam information through a MAC-CE in the PCell as shown in FIG. 9. Then, the base station may monitor the response of the UE to trigger an SCell transmission. The UE may reply an ACK if the UE receives the SCell activation MAC-CE successfully. When the response of the SCell activation MAC-CE is an ACK message, the base station may start an SCell transmission with both the PCell and SCell. For the case that the SCell configuration does not contain beam information, the UE may perform beam alignment by monitoring/measuring all the beam management RS (e.g., SS blocks or CSI-RS) in the SCell to find qualified DL TX beam and DL RX beam for reception data channel or control channel. On the other hand, for the case that the SCell configuration contains beam information, the UE may save resource of beam alignment. For example, if the UE receives a bitmap and beam information, the UE may only need to monitor/measure, for example, the SS block #2 for beam alignment. If the UE does not receive data or control information in the SCell, the UE may perform measurement in the SCell and send a measurement report to the base station through the PCell. The measurement report may be cell level or beam level. After the base station receives the measurement report of the SCell, the base station may send SCell configuration again to renew beam information if the beam level measurement result is good enough for the SCell transmission. If measurement result is below the threshold of the SCell transmission, the base station may send an SCell modification or SCell release through an RRC connection reconfiguration message.

Figure 10:
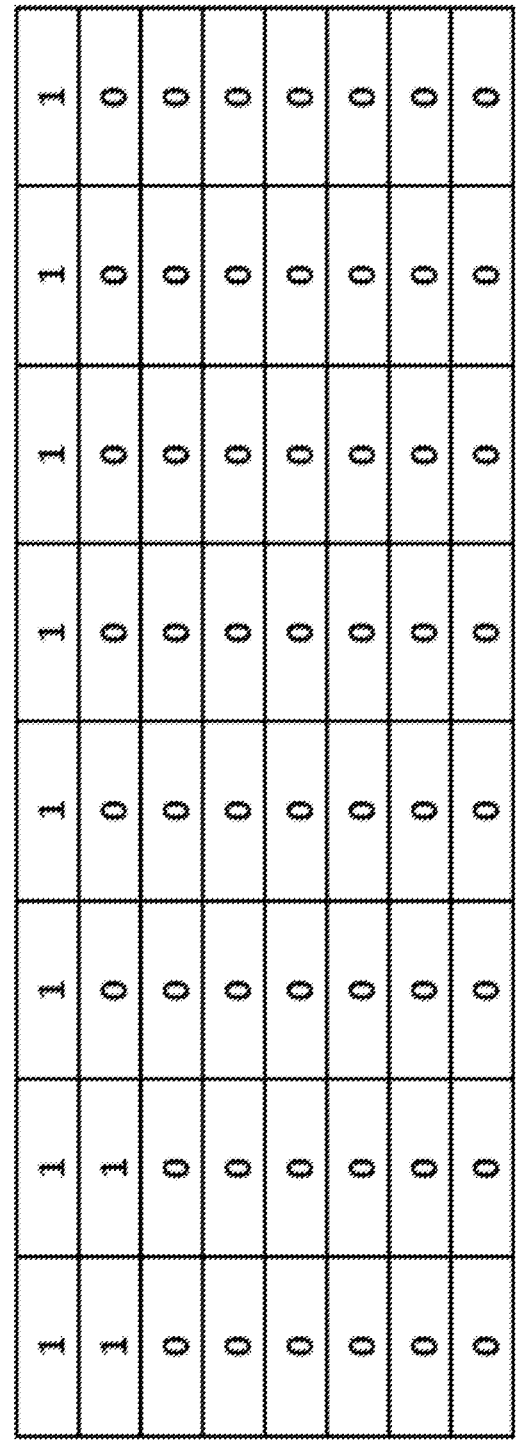
FIG. 10 is a diagram showing specific beam information in a MAC-CE, according to an example implementation of the present application.

In CASE 1-3 described above, the beam information is in a MAC-CE. A UE may perform cell measurement and send a beam level measurement report to a base station through a PCell if the measurement result is above a pre-determined threshold. If the base station receives the beam level measurement report of cells, the base station may add the beam information of SS block actual transmitted bitmap table in a MAC-CE as shown in FIG. 10. It is noted that the beam information may be a SS block actual transmitted bitmap which may be a detailed bitmap or group bitmap. The length of beam information bits for the detail bitmap is the same as the number of transmitted SS blocks. For example, the MAC-CE for beam information contains 64 bits and each bit represents one corresponding transmitted SS block by indexing order. After the UE receives the SCell configuration through RRC signaling of the PCell, the base station may activate SCell and provide specific beam information through the MAC-CE in the PCell as shown in FIG. 10. Then, the base station may monitor the response of the UE to trigger the scheduling of SCell transmission. The UE may reply an ACK if the UE receives the SCell activation MAC-CE successfully. If the response of the SCell activation MAC-CE is an ACK, the base station may start an SCell transmission with both the PCell and SCell. For the case that the SCell configuration does not contain beam information, the UE may perform beam alignment by monitoring/measuring all the beam management RS (e.g., SS blocks or CSI-RS) in the SCell to find qualified DL TX beam and DL RX beam for reception data channel or control channel. On the other hand, for the case that the SCell configuration contains beam information, the UE may save resource of beam alignment. For example, if the UE receives a bitmap and beam information as shown in FIG. 10, the UE only needs to monitor/measure the SS block #0~#9 for beam alignment. If the UE fails to receive data or control in SCell, the UE may perform measurement in the SCell and send the measurement report to the base station through the PCell. The measurement report may be cell level or beam level. After the base station receives the measurement report of the SCell, the base station may send the SCell configuration again to renew the beam information if the beam level measurement result is good enough for SCell transmission. If the measurement result is below the threshold of SCell transmission, the base station nay send SCell modification or SCell release through RRC connection reconfiguration.

In CASE 1-4 described above, the beam information is in a DCI and an RRC signal. The UE may perform cell measurement and send a beam level measurement report to the base station through a PCell if the measurement result is above a pre-defined threshold. If the base station receives the beam level measurement report of one or more cells, the base station may add the beam information of QCL configuration in RadioResourceConfigCommonSCell of SCell configuration as shown in FIG. 11. It is noted that the beam information could be contained in any sub information element in SCell configuration such as RadioResourceConfigCommonSCell or RadioResourceConfigDedicatedSCell. The beam information may be SS block index, SS block actual transmitted bitmap, CSI-RS resource index, antenna port information or QCL table. On the other hand, if the base station only receives cell level measurement report of SCell, SCell configuration may not contain beam information. After the UE receives SCell configuration through RRC signaling of the PCell, the base station may send an SCell activation command and TCI through DCI in the PCell as shown in FIG. 12. For example, if the UE receives a QCL configuration as shown in FIG. 11 and TCI as shown in FIG. 12, the UE may only monitor/measure CSI-RS resource #1 in SCell #2. The UE may reply an ACK if the UE receives data channel or control channel in the SCell successfully. If the UE does not receive data or control in the SCell, the UE may perform measurement in the SCell and send the measurement report to the base station through the PCell. The measurement report may be cell level or beam level. After the base station receives the measurement report of the SCell, the base station may send the SCell configuration again to renew beam information if the beam level measurement result is good enough for SCell transmission. If measurement result is below the threshold of SCell transmission, the base station may send an SCell modification or an SCell release through RRC connection reconfiguration.

For dual connective in CASE 2, the beam information is in RRC connection reconfiguration only. A UE may perform measurement for cells in a SCG and sends a beam level measurement report to a MCG if the measurement result is above the threshold. If the MCG receives the beam level measurement report of the SCG, the base station may add the beam information in the SCG configuration 1300 as shown in FIG. 13. It is noted that the beam information may be contained in both PSCell and SCell configurations. The beam information may be an SS block actual transmitted bitmap. On the other hand, if the base station only receives a cell level measurement report of the SCG, the SCG configuration may not contain beam information. After the UE receives the SCG configuration, the UE may start a RACH procedure for initial access in the PSCell of the SCG. For the case the PSCell configuration does not contain beam information, the UE may need to monitor/measure all SS blocks with different DL RX beam to perform beam alignment before starting RACH procedure. On the other hand, if there is beam information in the PSCell configuration, the UE may save resource of beam alignment procedure. For example, if the UE receives a bitmap as shown in FIG. 10, the UE may only need to monitor/measure the first eight SS blocks for beam alignment. After finding a qualified beam, the UE may perform a RACH procedure to access the PSCell of the SCG. If the UE fails to access the PSCell, the UE may perform measurement for cells in the PSCell, and send a measurement report to the MCG. The measurement report may be cell level or beam level. After the MCG receives the measurement report of the PSCell, the base station may send a PSCell configuration again to renew beam information if the beam level measurement report is good enough for SCell transmission. If the measurement result is below the threshold of SCell transmission, the base station may perform a PSCell reconfiguration through RRC connection reconfiguration.

Figure 14A:
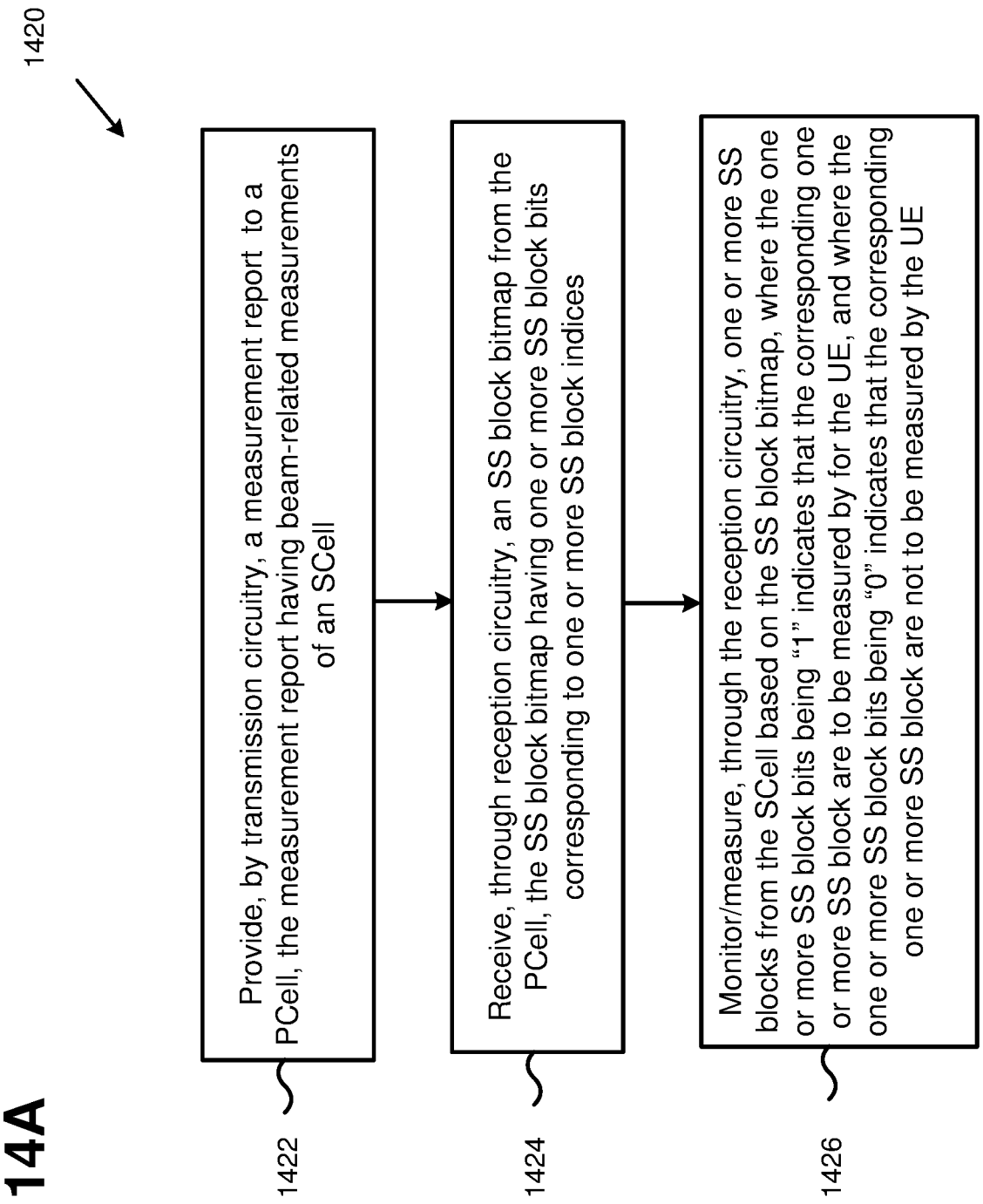
FIG. 14A is a flowchart of a method for a UE, according to an example implementation of the present application.

FIG. 14A is a flowchart of a method for a UE, according to an example implementation of the present application. In FIG. 14A, flowchart 1420 includes actions 1422, 1424, and 1426. In action 1422, the UE may provide, by transmission circuitry of the UE, a measurement report to a PCell, the measurement report having beam-related measurements of an SCell. In action 1424, the UE may receive, through reception circuitry, an SS block bitmap from the PCell, the SS block bitmap having one or more SS block bits corresponding to one or more SS block indices. In action 1424, the UE may monitor/measure, through the reception circuitry, one or more SS blocks from the SCell based on the SS block bitmap. An example of the bitmap is shown in FIG. 8 or 13. It should be noted that the one or more SS block bits being "1" indicates that the corresponding one or more SS block are to be measured by for the UE, while the one or more SS block bits being "0" indicates that the corresponding one or more SS block are not to be measured by the UE.

FIG. 14B is a flowchart of a method for a base station, according to an example implementation of the present application. In FIG. 14B, flowchart 1440 includes actions 1442 and 1444. In action 1442, the base station may receive, through reception circuitry of the base station, a measurement report having beam-related measurements of an Scell from a UE. In action 1442, the base station may provide, through transmission circuitry of the base station, an SS block bitmap to the UE from a Pcell, the SS block bitmap having one or more SS block bits corresponding to one or more SS block indices, where the SS block bitmap is transmitted to the UE through RRC signaling. An example of the bitmap is shown in FIG. 8 or 13. It should be noted that the one or more SS block bits being "1" indicates that the corresponding one or more SS block are to be measured by for the UE, while the one or more SS block bits being "0" indicates that the corresponding one or more SS block are not to be measured by the UE.

Figure 15:
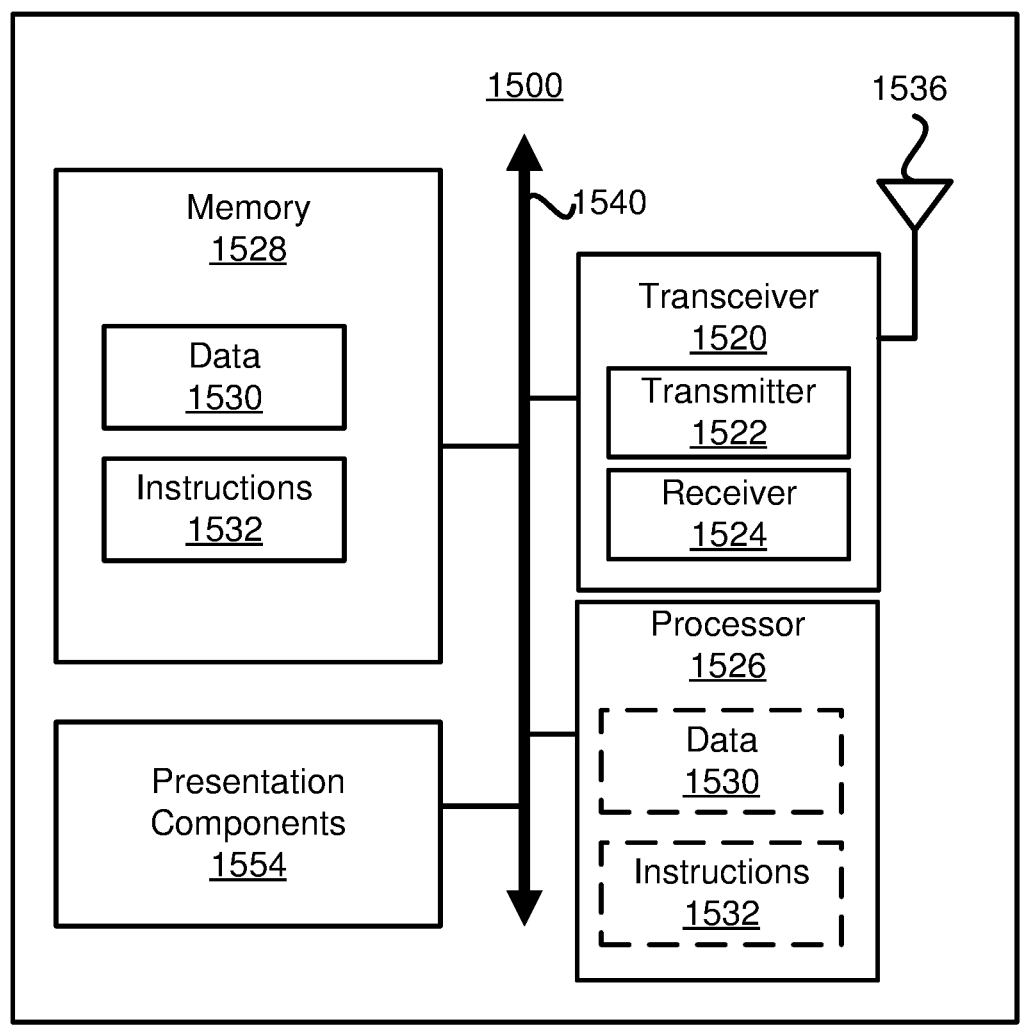
FIG. 15 illustrates a block diagram of a node for wireless communication, in accordance with various aspects of the present application.

FIG. 15 illustrates a block diagram of a node for wireless communication, in accordance with various aspects of the present application. As shown in FIG. 15, node 1500 may include transceiver 1520, processor 1526, memory 1528, one or more presentation components 1534, and at least one antenna 1536. Node 1500 may also include an RF spectrum band module, a base station communications module, a network communications module, and a system communications management module, input/output (I/O) ports, I/O components, and power supply (not explicitly shown in FIG. 15). Each of these components may be in communication with each other, directly or indirectly, over one or more buses 1540.

Transceiver 1520 having transmitter 1522 and receiver 1524 may be configured to transmit and/or receive time and/or frequency resource partitioning information. In some implementations, transceiver 1520 may be configured to transmit in different types of subframes and slots including, but not limited to, usable, non-usable and flexibly usable subframes and slot formats. Transceiver 1520 may be configured to receive data and control channels.

Node 1500 may include a variety of computer-readable media. Computer-readable media can be any available media that can be accessed by node 1500 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1528 may include computer-storage media in the form of volatile and/or non-volatile memory. Memory 1528 may be removable, non-removable, or a combination thereof. Example memory includes solid-state memory, hard drives, optical-disc drives, and etc. As illustrated in FIG. 15, memory 1528 may store computer-readable, computer-executable instructions 1532 (e.g., software codes) that are configured to, when executed, cause processor 1526 to perform various functions described herein, for example, with reference to FIGS. 1 through 14B. Alternatively, instructions 1532 may not be directly executable by processor 1526 but be configured to cause node 1500 (e.g., when compiled and executed) to perform various functions described herein.

Processor 1526 may include an intelligent hardware device, e.g., a central processing unit (CPU), a microcontroller, an ASIC, and etc. Processor 1526 may include memory. Processor 1526 may process data 1530 and instructions 1532 received from memory 1528, and information through transceiver 1520, the base band communications module, and/or the network communications module. Processor 1526 may also process information to be sent to transceiver 1520 for transmission through antenna 1536, to the network communications module for transmission to a core network.

One or more presentation components 1534 presents data indications to a person or other device. Example one or more presentation components 1534 include a display device, speaker, printing component, vibrating component, and etc.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for a user equipment (UE), the method comprising:
   receiving, through reception circuitry of the UE, a Synchronization Signal (SS) block bitmap for a secondary cell (SCell) or a primary secondary cell (PSCell) from a base station, the SS block bitmap having one or more SS block bits corresponding to one or more SS block indices;
   obtaining a resource location of one or more SS blocks from the SCell or the PSCell based on the SS block bitmap,
   wherein the SS block bitmap is configured by the base station, based on beam-related measurements of the SCell or the PSCell, through dedicated signaling when configuring the UE with the SCell or the PSCell.

2. The method of claim 1, further comprising providing, by transmission circuitry of the UE, a measurement report to a primary cell (PCell) of the base station, the measurement report having the beam-related measurements of the SCell or the PSCell.

3. The method of claim 1, wherein the SS block bitmap is received from a primary cell (PCell) of the base station, the PCell and the SCell are of a same cell group, or the PCell and PSCell are of a same cell group.

4. The method of claim 1, wherein the SS block bitmap is received from a primary cell (PCell) of the base station, the PCell and the SCell are of different cell groups, or the PCell and PSCell are of different cell groups.

5. The method of claim 1, wherein the one or more SS block indices correspond to one or more SS block positions in burst from the SCell or the PSCell.

6. The method of claim 1, wherein:
   the one or more SS block bits being "1" indicates that the corresponding one or more SS block are to be measured by the UE;
   the one or more SS block bits being "0" indicates that the corresponding one or more SS block are not to be measured by the UE.

7. A user equipment (UE) comprising:
   one or more non-transitory computer-readable media having computer-executable instructions embodied thereon;
   at least one processor coupled to the one or more non-transitory computer-readable media, and configured to execute the computer-executable instructions to:
   receive, through reception circuitry of the UE, a Synchronization Signal (SS) block bitmap for a secondary cell (SCell) or a primary secondary cell (PSCell) from a base station, the SS block bitmap having one or more SS block bits corresponding to one or more SS block indices;
   obtain a resource location of one or more SS blocks from the SCell or the PSCell based on the SS block bitmap,
   wherein the SS block bitmap is configured by the base station, based on beam-related measurements of the SCell or the PSCell, through dedicated signaling when configuring the UE with the SCell or the PSCell.

8. The UE of claim 7, wherein the at least one processor is further configured to execute the computer-executable instructions to:
   transmit, by transmission circuitry of the UE, a measurement report to a primary cell (PCell) of the base station, the measurement report having the beam-related measurements of the SCell or the PSCell.

9. The UE of claim 7, wherein the SS block bitmap is received from a primary cell (PCell) of the base station, the PCell and the SCell are of a same cell group, or the PCell and the PSCell are of a same cell group.

10. The UE of claim 7, wherein the SS block bitmap is received from a primary cell (PCell) of the base station, the PCell and the SCell are of different cell groups, or the PCell and the PSCell are of different cell groups.

11. The UE of claim 7, wherein the one or more SS block indices correspond to one or more SS block positions in burst from the SCell or the PSCell.

12. The UE of claim 7, wherein:
   the one or more SS block bits being "1" indicates that the corresponding one or more SS block are to be measured by the UE;
   the one or more SS block bits being "0" indicates that the corresponding one or more SS block are not to be measured by the UE.

13. A method for a base station, the method comprising:
   receiving, through reception circuitry of the base station, a measurement report having beam-related measurements of a secondary cell (SCell) or a primary secondary cell (PSCell) of the base station from a user equipment (UE);

configuring the SCell or the PSCell and a Synchronization Signal (SS) block bitmap for the SCell or the PSCell to the UE, the SS block bitmap being configured based on the beam-related measurements of the SCell or the PSCell;

providing, through transmission circuitry of the base station, the SS block bitmap to the UE through dedicated signaling from a primary cell (PCell) of the base station;

wherein the SS block bitmap includes one or more SS block bits corresponding to one or more SS block indices.

14. The method of claim 13, wherein the SS block bitmap is transmitted to the UE through Radio Resource Control (RRC) signaling from the PCell of the base station.

15. The method of claim 13, wherein the PCell and SCell are of a same cell group, or the PCell and PSCell are of a same cell group.

16. The method of claim 13, wherein the PCell and SCell are of different cell groups, or the PCell and PSCell are of different cell groups.

17. The method of claim 13, wherein the one or more SS block indices correspond to one or more SS block positions in burst from the SCell or the PSCell.

18. The method of claim 13, wherein:
the one or more SS block bits being "1" indicates that the corresponding one or more SS block are to be measured by the UE;
the one or more SS block bits being "0" indicates that the corresponding one or more SS block are not to be measured by the UE.

* * * * *